Feb. 28, 1956  A. I. WEINSTEIN ET AL  2,736,812
RADIOACTIVITY MEASURING APPARATUS
Filed Oct. 10, 1951

INVENTOR.
ALFRED I. WEINSTEIN
FRANCIS T. BONNER
BY

ATTORNEY

United States Patent Office 2,736,812
Patented Feb. 28, 1956

2,736,812

RADIOACTIVITY MEASURING APPARATUS

Alfred I. Weinstein, Patchogue, and Francis T. Bonner, Brooklyn, N. Y., assignors to the United States of America as represented by the United States Atomic Energy Commission Application October 10, 1951, Serial No. 250,625

3 Claims. (Cl. 250—43.5)

The present invention relates to an apparatus for measuring the radioactivity of an element in the gas phase.

In the investigation of various chemical reactions, radioactive tracers are used to study the mechanism of the induced transformations. As an illustration, radioactive tracer experiments using carbon-14 are of great importance because carbon is one of the principal constituents of organic and biological material. However, the radioactivity of the $C^{14}$ isotope is very difficult to measure because of the low energy of its emitted beta ray. Various techniques for measuring $C^{14}$ and other weak beta emitters have been developed using a gas containing this isotope as part of the Geiger counter filling. This requires using a Geiger-Müller tube with a variable filling and has the disadvantage that reproducible behavior of the tubes cannot easily be obtained. Another disadvantage of this method is that part of the gas product produced in the reaction under analysis must be removed from the gas system in order to be measured, resulting in the loss of this amount of such gas product.

Another method for measuring weak beta emitters is to seal the window of a standard thin window Geiger tube to a fluid flow system which contains the radioactive gas to be measured. In this method a relatively thick mica window must be used to withstand the great mechanical stress on that window caused by the high vacuum in the system. Accordingly, very weak beta rays that cannot penetrate the thick mica window will not enter the sensitive counting volume of the Geiger tube and cannot be counted.

The present invention permits a very thin window radiation counter tube to continuously monitor a radioactive gas in a fluid flow system without subjecting the window to any great mechanical stress. The apparatus permits the mica window to be isolated from the fluid flow system during the high vacuum pumping operation and when the system is subjected to higher pressures. Also, the apparatus can be used for the intermittent sampling of the flowing gas without disruption of the flow.

More particularly, the present invention relates to an apparatus for coupling a thin window radiation counter tube into a fluid flow system which comprises a tubular element partially circumscribing a chamber, the remainder of said chamber being bounded by the thin window of the counter tube. Means are provided for transmitting the fluid in the system through the tubular element without communication with said chamber. Means for transmitting the fluid through the tubular element with communication with said chamber are also provided. The tubular element is rotatably mounted in a conforming jacket which contains an inlet and outlet port for said fluid. Means are included for rotating the tubular element through at least two positions whereby the inlet and outlet ports are aligned with the first mentioned fluid transmitting means in one position and with the second mentioned fluid transmitting means in the second position.

It is accordingly an object of the present invention to provide a new and improved apparatus for measuring low energy radioactive material in the gas phase.

A second object of the invention is to provide a new and improved apparatus for coupling a thin window radiation counter tube to a fluid flow system without subjecting the thin window to high mechanical stress.

Another object of the invention is to provide a new and improved apparatus for continuously or intermittently monitoring a radioactive fluid in a fluid flow system.

Still another object of the invention is to provide a new and improved apparatus for measuring the radioactivity of a static gas sample at a measured pressure and volume.

The many objects and advantages of the present invention may best be appreciated by reference to the accompanying drawings, the figures of which illustrate a preferred embodiment of the present invention. In the drawings.

Figure 1:
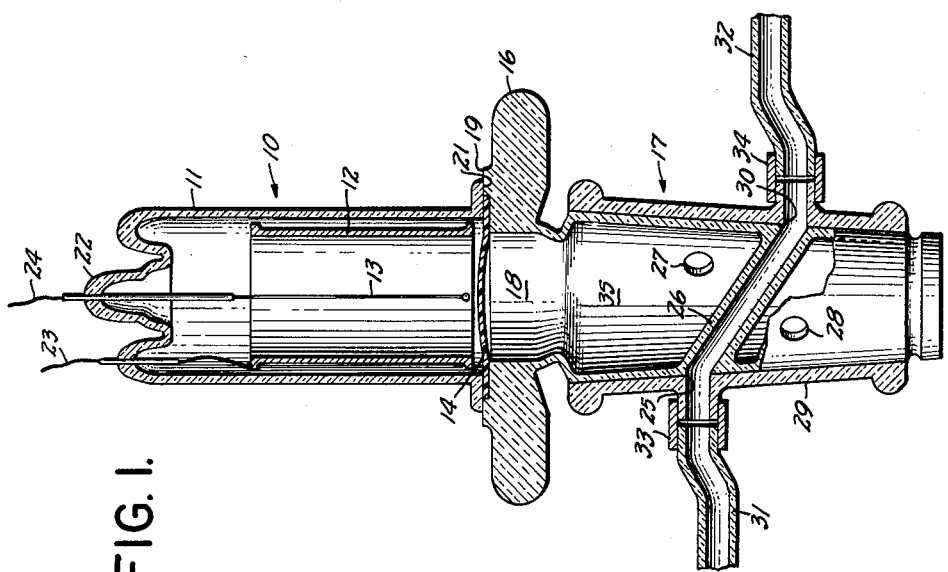
Figure 1 is a sectional view of the apparatus showing the interior construction details.

Referring to Figure 1, a conventional thin window radiation counter indicated generally by the numeral 10 and comprising an envelope 11, a cathode 12, an anode 13 and a thin mica window 14, is mounted on the male or valve portion 16 of a two-way hollow bore stopcock indicated generally by the numeral 17. The top central portion of the rotatable element 16 has been removed to form an open channel 18 and the remainder has been flattened to form a flange 19 which mates with a similar flange 21 on the bottom of the envelope 11 of the Geiger tube. The thin mica window 14 is cemented between the two flanges 19 and 21 to form an air-tight seal. The envelope 11 of the radiation counter tube is evacuated, filled with a counting gas and sealed. A generous portion 22 is left for further evacuations and fillings. Operating potentials and the output pulse of the Geiger tube are carried on conductors 23 and 24. Rotatable element 16 of the stopcock 17 also contains a tubular conduit 26 running laterally through the lower central portion thereof. Also drilled through the surface of member 16 are two holes 27 and 28 circumferentially spaced approximately 180° apart. The female portion or jacket 29 of the stopcock 17 contains an inlet port 25 and an outlet port 30 which are coupled between fluid conduits 31 and 32 by means of standard couplings 33 and 34.

In the operating position shown in Figure 1, a fluid flowing through conduit 31 will be transmitted through the stopcock 17 to conduit 32 by means of inlet and outlet ports 25 and 30 respectively and conduit 26. In this position the fluid flowing through the system is segregated from the chamber 35 circumscribed by the rotatable element 16 and the mica window 14. For future reference the above described position will be called position No. 1.

Figure 2:
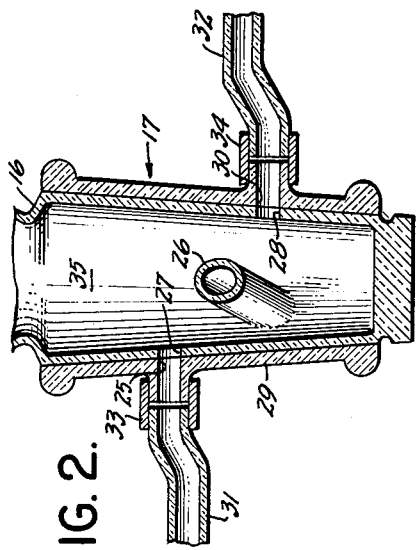
Figure 2 is a sectional view of the lower portion of the apparatus after the rotatable element has been rotated 90° from the position shown in Figure 1.

Referring now to Figure 2, the lower half of stopcock 17 is shown with the rotatable element 16 turned approximately 90° from position No. 1 so that the hole 27 is aligned with inlet port 25, and hole 28 is aligned with outlet port 30. In this position gas flowing from conduit 31 will pass through inlet port 25 and hole 27 into the chamber 35. The gas therefore will fill the internal chamber 35 of member 16 so that the radioactive material will be adjacent the thin mica window 14. Any radioactive particles emitted by the gas will easily penetrate the thin window 14 to enter the sensitive volume of the counter 10 wherein it will cause a breakdown between anode 13 and cathode 12 with a resulting output pulse on conductor 24. After the gas has communicated with chamber 35 it will be transmitted through hole 28 and outlet port 30 to fluid conduit 32. Therefore, in the operating position of the apparatus shown in Figure 2, the radioactivity of all the fluid flowing between conduits 31 and 32 will be continuously measured by the Geiger counter 10. The above described position will be called position No. 2.

Figure 3:
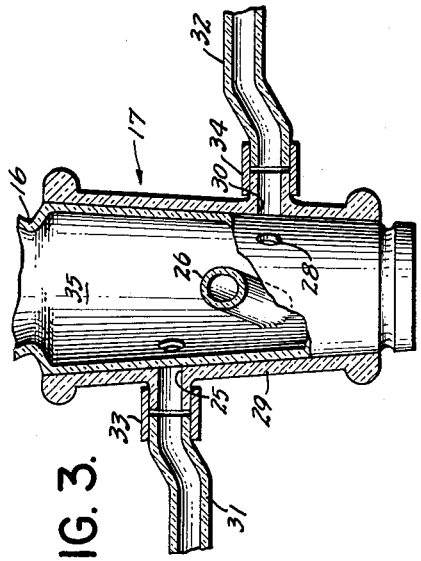
Figure 3 is a sectional view similar to Figure 2 but with the rotatable element shown at a third position intermediate those shown in Figures 1 and 2.

Referring to Figure 3, the rotatable element 16 of stopcock 17 is shown rotated to a position intermediate positions No. 1 and No. 2 so that neither the holes 27 and 28 nor the conduit 26 are aligned with ports 25 and 30. In this position gas flow between conduits 31 and 32 is prevented by the surface of the rotatable element 16. This position will be called position No. 3.

In using the above described apparatus, the assembly is first installed between the conduits of the fluid flow system wherein the reaction under investigation is to be carried out. Rotatable element 16 is then adjustable to position No. 1 so that the entire system can be evacuated. The sudden change in the pressure in the system does not affect the thin window 14 as the window is isolated from the rest of the system in this position. When the proper pressure level has been reached, the radioactive fluid to be measured may be introduced into the system or the reaction under study may be started. If it is desired to continuously monitor the radioactivity of the fluid flowing between conduits 31 and 32, the valve element 16 may be slowly rotated to position No. 2 so that the chamber 35 may be also evacuated without a sudden pressure change. In this manner a high vacuum in the entire system may be obtained without subjecting the thin window 14 to any large flexural stresses. Therefore, a very thin window may be used with the apparatus to permit the measurement of very weak radioactive particle emitters.

The apparatus may also be used to measure samples of the fluid obtained at particular time intervals. To accomplish this, element 16 can be quickly operated from position No. 1 to position No. 2 and back to position No. 1 at the desired time intervals with little interruption of the fluid flow. The sample of the fluid is then counted while the remainder of the material continues to flow through the system.

Position No. 1 may also be used to isolate the thin window from the fluid flow system after the radioactive measurements have been completed. This permits other measurements of the reaction under study to be taken without rearranging the chemical apparatus. For example, the variations of the reaction with pressure may be studied without any danger of rupturing the thin window of the counter.

The apparatus can be used to count a static gas sample at a measured pressure and volume. This is obtained by operating the rotatable element 16 from position No. 2 to position No. 3.

It should be noted that in all the above described methods using the apparatus, none of the gas produced is lost to the system. Once the counting operation is finished, the sample is reintroduced into the system by operating element 16 to position No. 2. Also, the radioactivity of the fluid is measured as it is produced in the system without the necessity for converting it into a new compound. For example, in studying the reaction of carbon dioxide and charcoal to produce carbon monoxide, the radioactivity of the $C^{14}$ tracer was measured as it left the charcoal. Normally, the $C^{14}$ would have had to be converted to $CO_2$ before its radioactivity could have been measured. In addition to the operational advantages already mentioned, the counter 10 can easily be removed from the system for refilling of the counting gas. The counter is mounted integrally with the top of element 16 so that it will rotate with that element and always maintain the same position with respect to the chamber 35.

While the salient features of this invention have been described in detail with respect to one embodiment, it will of course be apparent that numerous modifications may be made within the spirit and scope of this invention and it is therefore not desired to limit the invention to the exact details shown except insofar as they may be defined in the following claims.

We claim:

1. Apparatus for measuring relatively weak radioactivity in a fluid comprising in combination a rotatable tubular element having a chamber therein adapted to contain a fluid under pressure, a radiation detector mounted on said element for rotation therewith and having a thin window forming a part of the walls of said chamber, said window being adapted to permit the passage of weak radioactivity to the active volume of said detector, a conforming jacket supporting said element and having an inlet and an outlet port for the fluid, a conduit through said element for conducting a fluid therethrough while segregating the fluid from said window, means for passing said fluid through said chamber and means for rotating said element to at least two positions, in one of which said inlet and outlet ports communicate with said conduit and in the other of which said inlet and outlet ports communicate with said fluid-passing means.

2. Apparatus for measuring relatively weak radioactivity in a fluid comprising in combination a hollow, rotatable, tubular element forming a chamber adapted to contain a fluid under pressure and having two pairs of passageways in the wall thereof, a radiation detector mounted on said element for rotation therewith and having a thin window forming a part of the walls of said chamber, said window being adapted to permit the passage of weak radioactivity from said chamber into the active volume of said detector, a conforming jacket rotatably supporting said element and having an inlet and an outlet port for a fluid, a conduit through said element connecting one of said pairs of passageways for conducting a fluid through said element while segregating the fluid from said window, the other of said pairs of passageways communicating with said chamber and means for rotating said element to at least three positions, in one of which one pair of passageways is aligned with said inlet and outlet ports, in another of which the other pair of passageways is aligned with said inlet and outlet ports and in the third fluid flow through said inlet and outlet ports is prevented.

3. The aparpatus of claim 2 in which the pair of passageways communicating with the chamber are circumferentially disposed 180° apart in the wall of the element.

References Cited in the file of this patent

UNITED STATES PATENTS

| 1,081,688 | Mohl | Dec. 16, 1913 |
| 1,534,958 | Huss | Apr. 21, 1925 |
| 1,808,092 | Wimmer | June 2, 1931 |
| 1,973,754 | Geyer | Sept. 18, 1934 |
| 2,552,723 | Koury | May 15, 1951 |
| 2,590,925 | Borkowski et al. | Apr. 1, 1952 |